United States Patent
Smith

(10) Patent No.: US 8,573,680 B2
(45) Date of Patent: Nov. 5, 2013

(54) VEHICLE TRAILER WITH IMPROVED AERODYNAMICS

(75) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 33 days.

(21) Appl. No.: 13/350,673

(22) Filed: Jan. 13, 2012

(65) Prior Publication Data
US 2013/0181479 A1 Jul. 18, 2013

(51) Int. Cl.
*B62D 35/00* (2006.01)

(52) U.S. Cl.
USPC .................................................... 296/181.5

(58) Field of Classification Search
USPC ................ 296/181.5, 180.1–180.5; 180/903
See application file for complete search history.

(56) References Cited

U.S. PATENT DOCUMENTS

| | | | |
|---|---|---|---|
| 2,038,265 A | 4/1936 | Bradley | |
| 2,118,127 A * | 5/1938 | Wulle | 105/74 |
| 3,724,892 A | 4/1973 | Ridder | |
| 3,802,716 A | 4/1974 | Wiers | |
| 4,132,326 A | 1/1979 | Pinto | |
| 4,236,745 A | 12/1980 | Davis | |
| 4,257,641 A | 3/1981 | Keedy | |
| 4,269,444 A * | 5/1981 | Emory | 296/181.5 |
| 4,413,943 A | 11/1983 | Liljestrom | |
| 4,508,380 A | 4/1985 | Sankrithi | |
| 4,557,497 A | 12/1985 | Rumminger | |
| 4,682,808 A | 7/1987 | Bilanin | |
| 4,865,341 A | 9/1989 | Hicks | |
| 5,051,046 A | 9/1991 | Oren | |
| 5,190,342 A | 3/1993 | Marlowe | |
| 5,199,738 A | 4/1993 | VanDenberg | |
| 6,036,207 A | 3/2000 | Oehlerking | |
| 6,036,250 A | 3/2000 | Glatter | |
| 6,113,338 A | 9/2000 | Smith | |
| 7,377,488 B2 | 5/2008 | Schutt | |
| 7,380,825 B2 | 6/2008 | Peveler | |
| 2003/0132644 A1 | 7/2003 | Crews | |

(Continued)

FOREIGN PATENT DOCUMENTS

WO 2008/125863 A1 10/2008

OTHER PUBLICATIONS

Leuschen, J., and K.R. Cooper, "Full-Scale Wind Tunnel Tests of Production and Prototype, Second-Generation Aerodynamic Drag-Reducing Devices for Tractor-Trailers," Study Report 06CV-222, National Research Council (NRC), Ottawa, © 2006 SAE International, 8 pages.

(Continued)

*Primary Examiner* — H Gutman
(74) *Attorney, Agent, or Firm* — Christensen O'Connor Johnson Kindness PLLC

(57) ABSTRACT

Trailers, such as semi-trailers, having configurations that improve the aerodynamic efficiency thereof are provided. In some examples, aerodynamically configured trailers are provided that maintain standard cargo capacity. To improve the aerodynamic efficiency, the rearward end of the trailer in some embodiments include a downward cant or slope. In use, the rearward cant or slope reduces the low-pressure region that trails the end of the trailer, thereby reducing pressure drag. In accordance with another aspect, to accommodate loading and unloading of the downwardly canting or sloping trailer, examples of the trailers may also be equipped with "sliding trailer axle" and/or extended travel landing gear so as to allow the trailer to interface with standard loading dock heights as well as rampless ground loading/unloading.

19 Claims, 12 Drawing Sheets

(56) References Cited

U.S. PATENT DOCUMENTS

| | | |
|---|---|---|
| 2007/0296173 A1 | 12/2007 | Regnell |
| 2008/0116715 A1 | 5/2008 | Steel |
| 2010/0007172 A1* | 1/2010 | Zhu .......................... 296/181.5 |
| 2012/0098295 A1* | 4/2012 | Zhu .......................... 296/181.5 |

OTHER PUBLICATIONS

"Operating Instructions & Maintenance Procedures: Challenger Series—Model 50000, Contender Series—Model 51000, and Fast Gear Series—FG4000," XL-LG330-01 Rev. B, Holland USA, Inc., Muskegon, Mich., Mar. 2005, pp. 1-4.

* cited by examiner

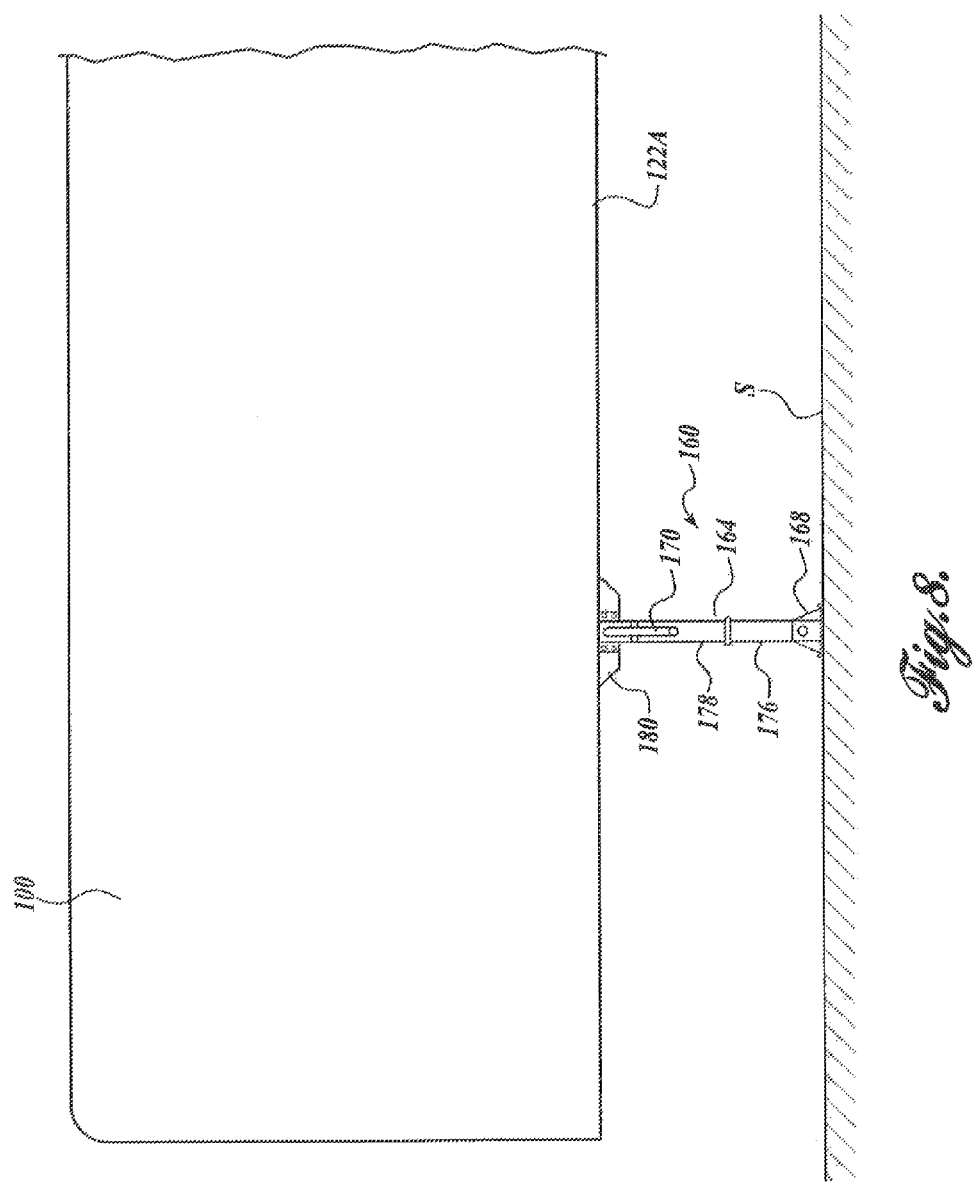

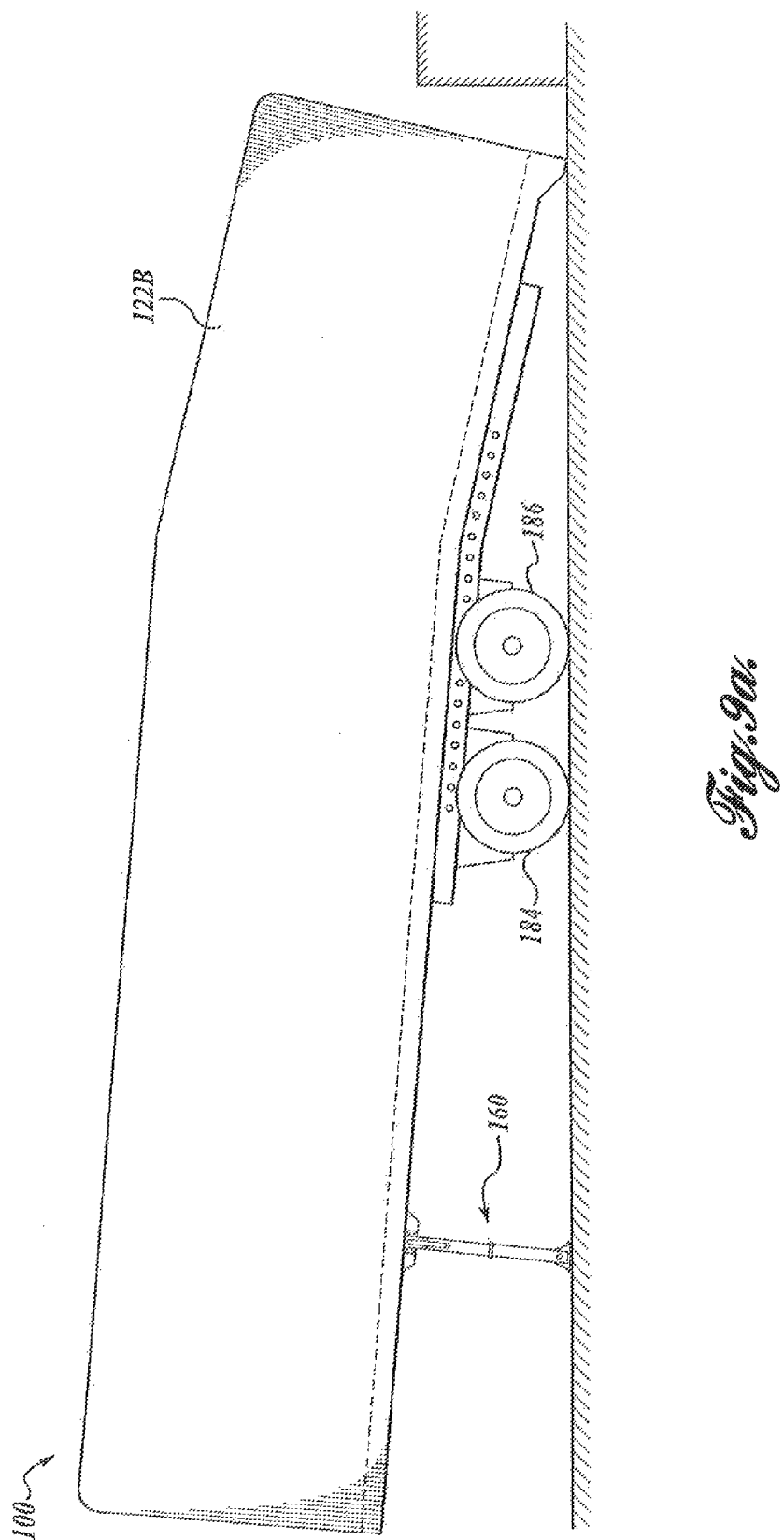

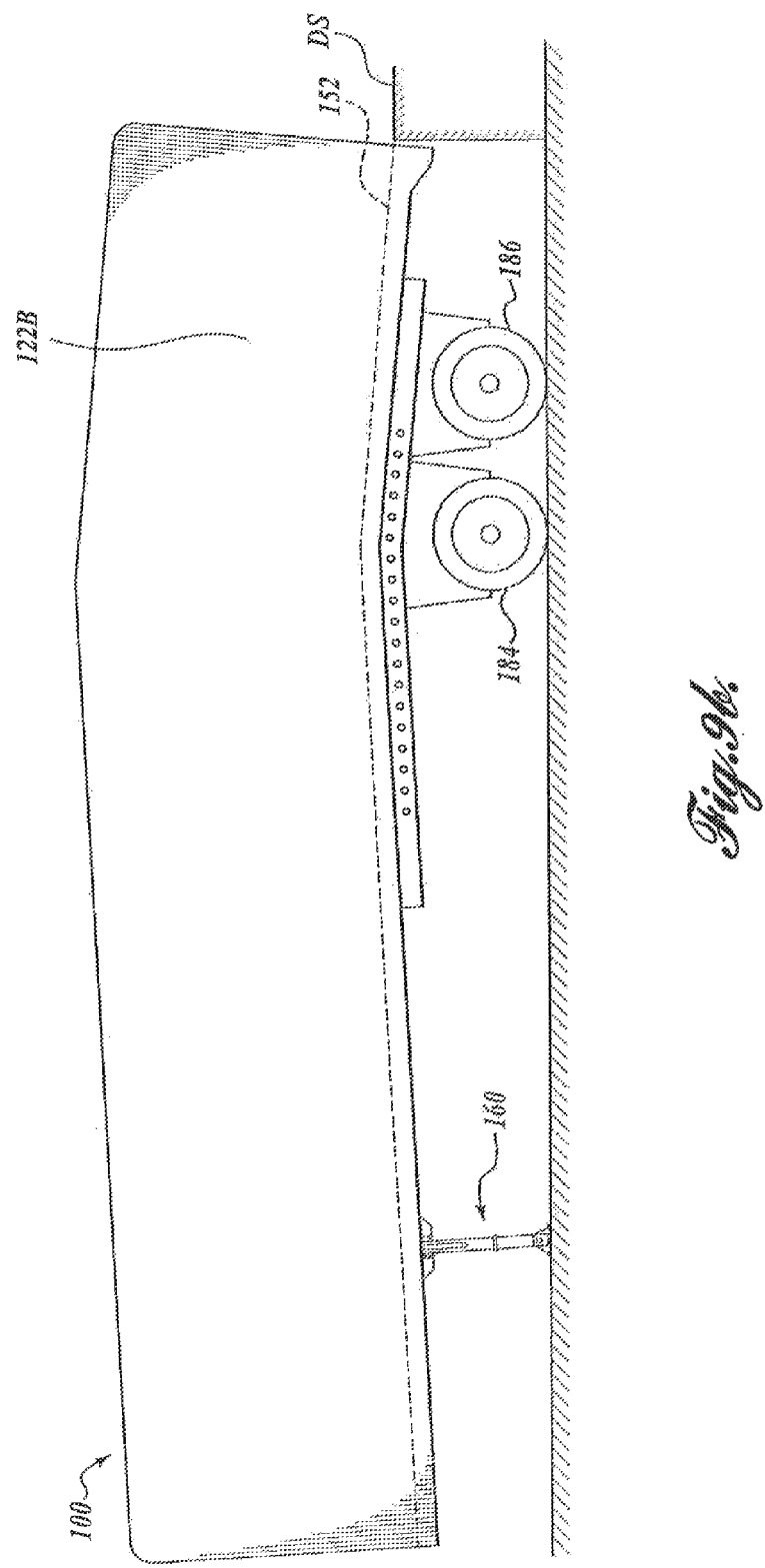

VEHICLE TRAILER WITH IMPROVED AERODYNAMICS

BACKGROUND

Numerous means have been sought to improve the fuel-efficiency of moving bodies and, especially, moving bluff bodies by reducing their aerodynamic drag. In the field of surface transportation and, particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor 18 having a so-called fifth wheel by which a box-like semi-trailer 24 may be attached to the tractor 18 by an articulated connection for transportation of the semi-trailer, as shown in FIG. 1.

It is well known that the aft ends of bluff bodies, such as trailers, are known to contribute significantly to aerodynamic drag, as evidenced by the formation of a wake 30 in the trailing region behind the trailer 24. The generation of the wake, formed by eddies, can be contributed to the shape of the conventional trailer, which is essentially a rectangular box having a flat, rectangular roof 38 and matching floor 40, along with flat, rectangular side panels 42. The fore and aft vertical surfaces 44 and 46 of such trailers are also generally flat rectangular surfaces. As such, current bluff bodies, such as trailer 24, which is suitable for use with tractors of the Class 8 type, suffer from a low-pressure zone at the rear of the trailer such that the air stream 50 suffers from early separation, resulting in a broad eddying wake 30 forming downstream of the separation, as best shown in FIG. 1. The net result is the creation of considerable aerodynamic drag.

Unfortunately, attempts to make the trailer shape more aerodynamic within the overall length of the trailer have been accompanied by reduced carrying capacity and interference during loading of the trailer. Additionally, attempts to make the rear of the trailer more aerodynamic, for example, by the addition of panels or inflatable bladders (not shown), can suffer from disadvantages such as added weight and a significant lengthening of the trailer, with associated reductions in fuel efficiency and more difficult handling characteristics.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a trailer is provided. The trailer comprises a wheel assembly including an axle having wheels mounted thereon and a trailer body carried at least partially by the wheel assembly. In some embodiments, the trailer body includes a forward section having a generally planar bottom and a rearward section having a generally planar bottom. The rearward section adjoins the forward section and slopes downwardly with respect to the forward section as it extends rearwardly thereof such that an angle is generated between the forward section bottom and the rearward section bottom.

In accordance with another aspect of the present disclosure, a trailer is provided. The trailer comprises a trailer body having a forward end and a rearward end, wherein the rearward end is positioned at a lower elevation with respect to a ground surface than the forward end. The trailer also includes at least one wheel assembly. The at least one wheel assembly includes an axle and at least two wheels mounted thereon and associated with the rearward end of the trailer body. In some embodiments, the wheel assembly is adjustably movable rearwardly with respect to the trailer body such that the rearward end of the trailer body is elevated to approximately standard docking height.

In accordance with another aspect of the present disclosure, a trailer is provided. The trailer comprises a trailer body having a forward end and a rearward end, wherein the rearward end is positioned at a lower elevation with respect to a ground surface than the forward end. The trailer also includes at least one support assembly associated with the forward end of the trailer body, wherein the support assembly has an adjustably extendible support leg. The trailer further includes at least one wheel assembly. The at least one wheel assembly includes an axle and wheels mounted thereon. The at least one wheel assembly is associated with the rearward end of the trailer body. The at least one support is positionable such that the rearward end of the trailer body is positionable between a standard docking height and a position proximate the ground surface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a partial view of one example landing gear shown in FIGS. 4A and 4B and formed in accordance with aspects of the present invention;

FIGS. 9A and 9B are side views of the trailer in first and second loading/unloading positions utilizing one example of a "slidable wheel assembly;"

DETAILED DESCRIPTION

Figure 1:
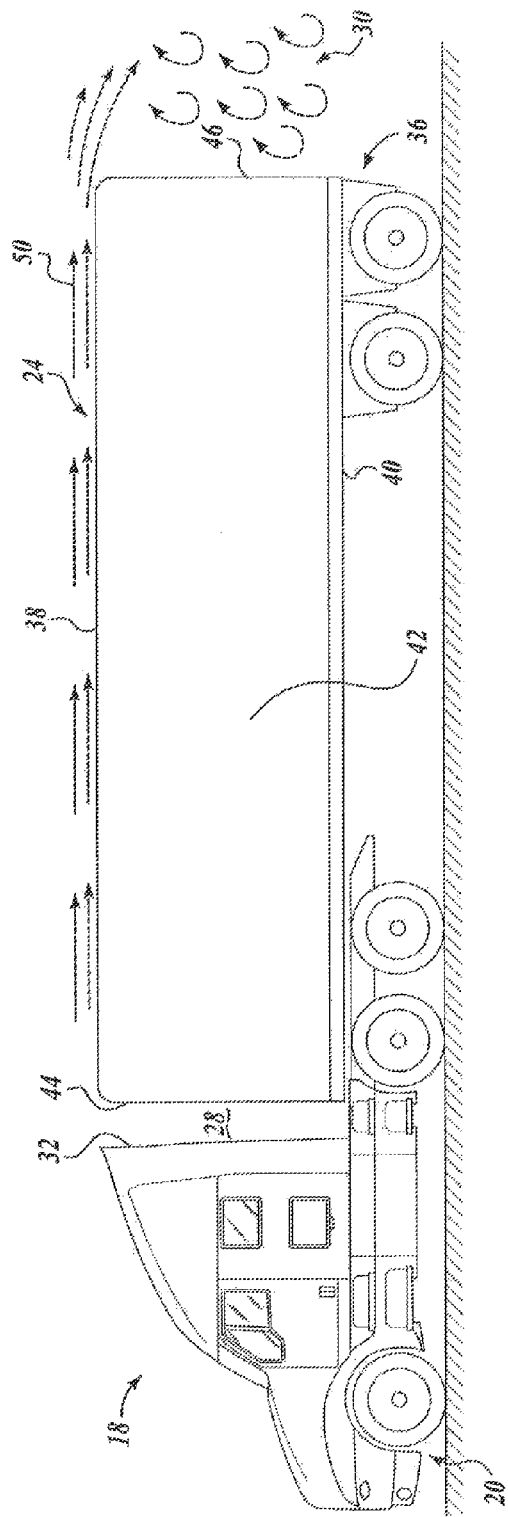
FIG. 1 is a side view of a prior art tractor-trailer combination showing the flow path of an air stream over the trailer thereof during movement of the vehicle.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of systems and methods for improving the aerodynamic efficiency (e.g., reduce drag) on vehicles, such as class 8 tractor-trailer combinations. In some examples, aerodynamically configured trailers are provided that maintain standard cargo capacity. To improve the aerodynamic efficiency, the rearward end of the trailer of some embodiments includes a downward cant or slope of, for example, approximately 6-15 degrees. In use, the rearward cant or slope reduces the low-pressure region that trails the end of the trailer, thereby reducing pressure drag. This configuration also maintains the cargo capacity of the trailer.

In accordance with another aspect of the present disclosure, to accommodate loading and unloading of the trailer, examples of the trailer described herein may also be equipped with additional mechanisms that allow the trailer to interface with standard loading dock heights. For example, the trailer may include a "sliding trailer axle" that translates the rear axle(s) of the trailer rearwardly with respect to the cargo area in order to tilt the sloped rear end of the trailer upwards to the height of the loading dock. Additionally or alternatively, the trailer may include landing gear configured to have extended travel ranges that may be used to raise and lower both trailer ends, thereby making rampless ground loading/unloading as well as standard dock height loading/unloading an option.

Although embodiments of the present invention will be described with reference to a semi-trailer, one skilled in the relevant art will appreciate that the disclosed embodiments are illustrative in nature, and therefore, should not be construed as limited to applications with a semi-trailer. It should therefore be apparent that the methods and systems of the present disclosure have wide application, and may be used in any situation where a reduction in the drag forces on a bluff body is desirable. It should be noted that for purposes of this disclosure, terminology such as "upper," "lower," "vertical," "horizontal," "fore," "aft," "inner," "outer," "front," "rear," etc., should be construed as descriptive and not limiting.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 2:
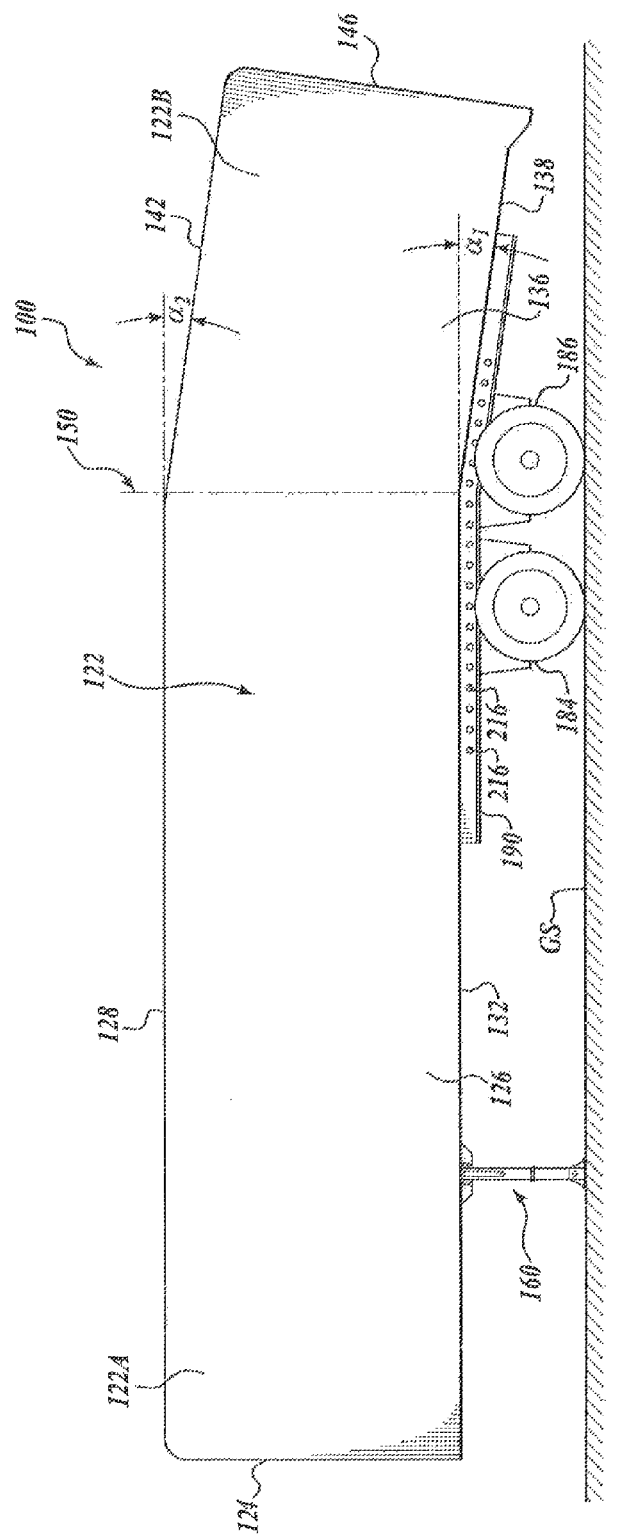
FIG. 2 is a side view of one example of a trailer constructed in accordance with aspects of the present disclosure.

FIG. 2 illustrates one example of a drag reducing trailer 100 formed in accordance with aspects of the present disclosure. As best shown in FIG. 2, the trailer 100 is suitable for use with a pull vehicle, such as a Class 8 tractor shown in FIG. 3. During use, the configuration of the trailer 100 aids in the reduction of aerodynamic drag as compared to conventional box-like trailers, which is illustrated in FIG. 1. In one embodiment, the trailer 100 is configured with a cargo capacity equal to or greater than that of a standard boxed shaped container trailer. Further, as will be described in detail below, the trailer 100 may include mechanisms such as specifically configured landing gear or a rearwardly sliding rear axle(s) or wheel assemblies so that the trailer 100 is capable making rampless ground loading/unloading as well as standard dock height loading/unloading an option.

As best shown in FIG. 2, the trailer 100 includes a trailer body 122 having fore and aft adjoining body sections 122A and 122B that define a cargo carrying interior cavity (not shown). In the embodiment shown, the fore section 122A is generally rectangular in shape, having a generally planar, vertically oriented front end panel 124, generally planar, vertically oriented side panels 126, a top panel 128 and a generally planar, bottom panel 132. Similarly, the aft section 122B is generally rectangular in shape, having vertically oriented side panels 136, a generally planar, bottom panel 138, a top panel 142, and a generally planar, rear end panel 146. In the embodiment shown in FIG. 2, the aft section 122B adjoins the fore section 122A at a common plane, generally designated 150, which may or may not be substantially vertical with respect to a ground surface GS, and cants or slopes downwardly with respect to the fore section 122A as it extends rearwardly thereof. As a result, an angle $\alpha_1$ is generated between the fore section bottom panel 132 and the aft section bottom panel 138. In some embodiments, an angle $\alpha_2$ substantially similar to angle $\alpha_1$ is generated as between the fore section top panel 132 and the aft section top panel 142, although it is contemplated that angle $\alpha_2$ can be different than angle $\alpha_1$. In some embodiments, the aft section top panel 142 and/or the fore section top panel 132 can be slightly convex in shape.

Figure 4:
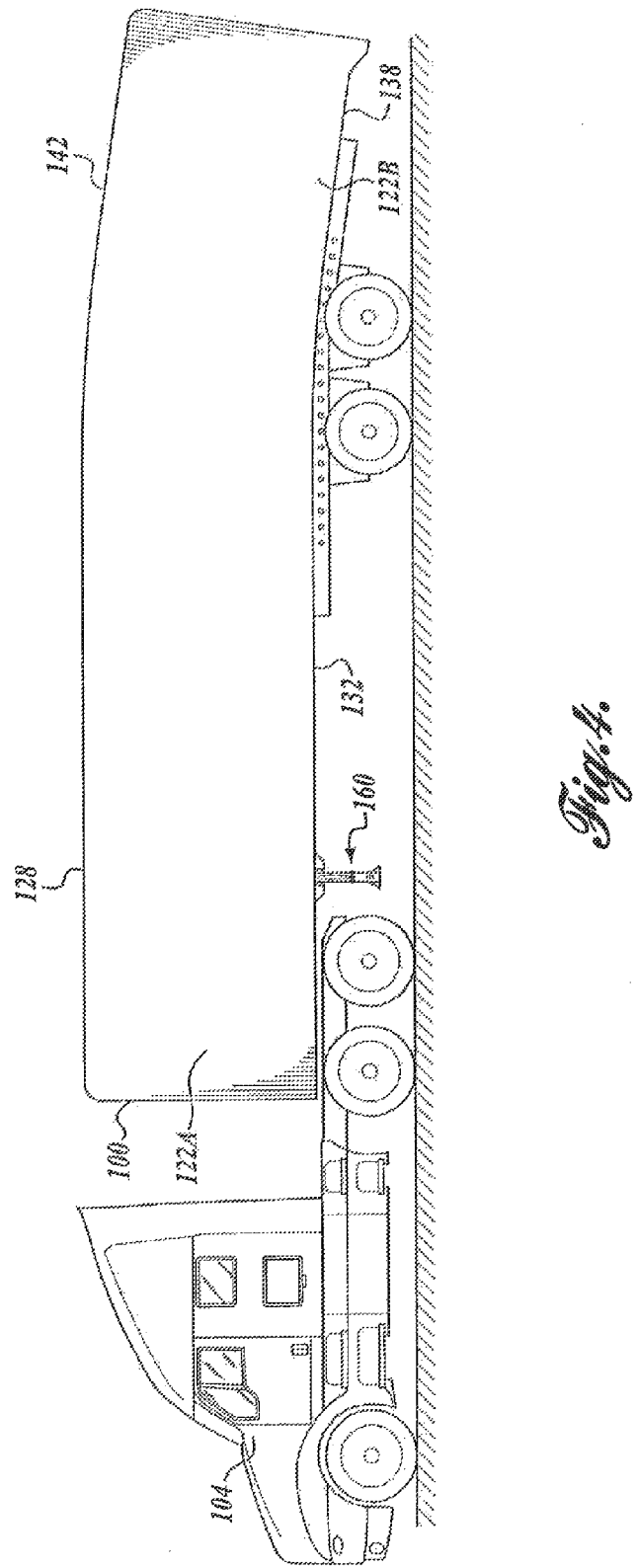
FIG. 4 is a side view of another example of a trailer constructed in accordance with aspects of the present disclosure.

While the top panels 128 and 142 and the bottom panels 132 and 138 are shown in FIG. 2 to respectively adjoin to form edges, it will be appreciated that other configurations are contemplated. For example, the transition from the top panel 128 to the top panel 142 may form a general convex curve, as best shown in FIG. 4. Additionally or alternatively, in some embodiments, the transition from the bottom panel 132 to the bottom panel 138 may form a general convex curve, also shown in FIG. 4.

Figure 5:
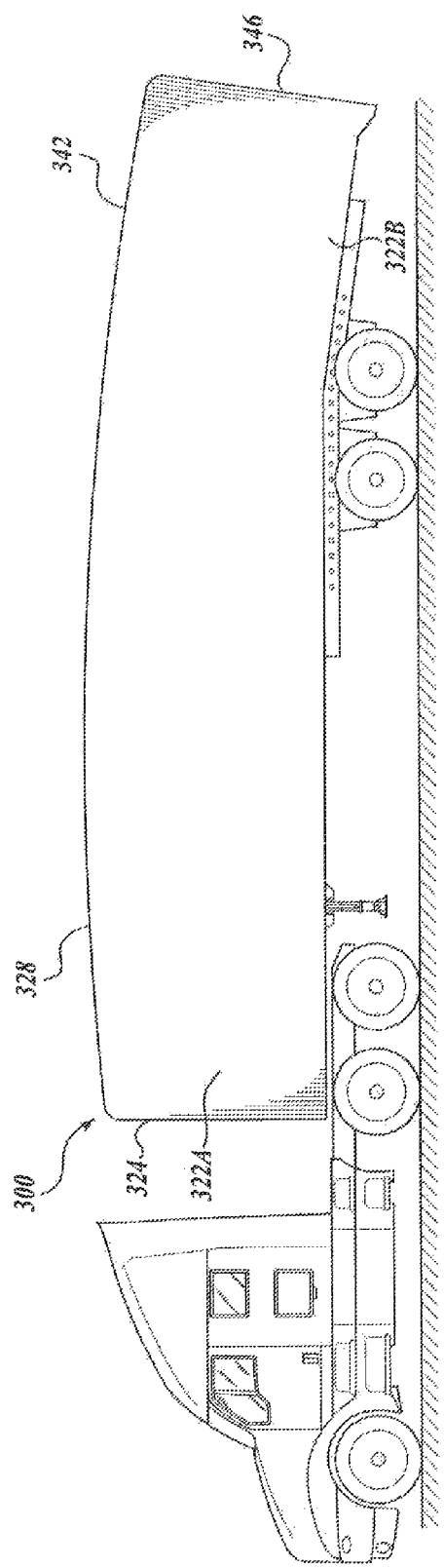
FIG. 5 is a side view of yet another example of a trailer constructed in accordance with aspects of the present disclosure.

FIG. 5 illustrates another embodiment of a trailer 300 formed in accordance with aspects of the present disclosure. The trailer 300 is configured and arranged substantially similar to the trailer 100 except for the differences that will now be described. As best shown in FIG. 5, the top panels 328 and 342 of the trailer 300 may form a continuous arch or convex plane as the top surface of trailer 300 extends from the front end panel 324 to the rear end panel 346. In other embodiments, the trailer 300 may additionally include a convexly curved transition between the bottom panel 332 to the bottom panel 338.

According to another aspect of the present disclosure, the trailers 100 and 300 may employ additional components that aid in the reduction of pressure drag thereon. In that regard, please refer now to FIG. 6, where an embodiment of trailer 100 is shown in combination with a boat-tail assembly 154 mounted in a conventional manner to the end of the trailer 100. In the embodiment shown, the boat-tail assembly 154 includes top and bottom fairings 154A and 154B and side fairings 154C and 154D. In some embodiments, the fairings 154A-154D may be positioned so as to extend rearwardly of the trailer 100 in a laterally inwardly manner.

Figure 6:
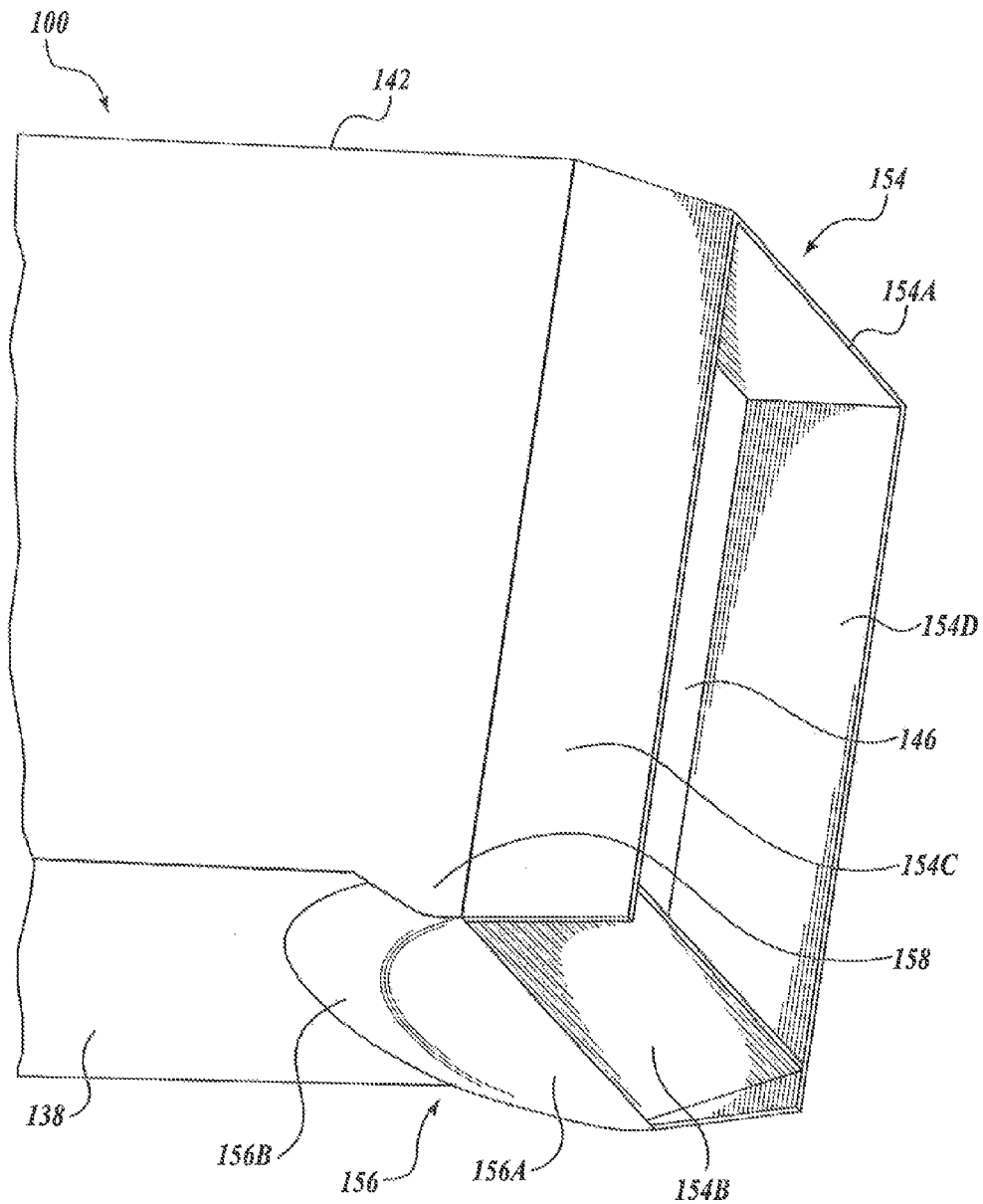
FIG. 6 is a side view of still yet another example of a trailer constructed in accordance with aspects of the present disclosure.

In some embodiments, other components may be alternatively or additionally employed in order to aid in the reduction of pressure drag on the trailer 100, such as transition device 156. As shown in FIG. 6, the transition device 156 is mounted to the bottom panel 138 adjacent to a bumper assembly 158. The transition device 156 in one embodiment may include a first planar surface 156A that is oriented so as to form a smooth transition to the bottom fairing 154B. In one embodiment, the first surface 156A and the bottom fairing 154B are co-planar, although other configurations may be employed to achieve the same or similar results. The transition device 156 also includes a second surface 156B that is convex in shape and functions as a smooth transition from the bottom panel 138 to the first surface 156A, as best shown in FIG. 6. In the embodiment shown, the second surface may be also somewhat rounded from the left side of the trailer to the right side of the trailer, as shown, although other configurations may be employed to achieve the same or similar results.

Figure 7A:
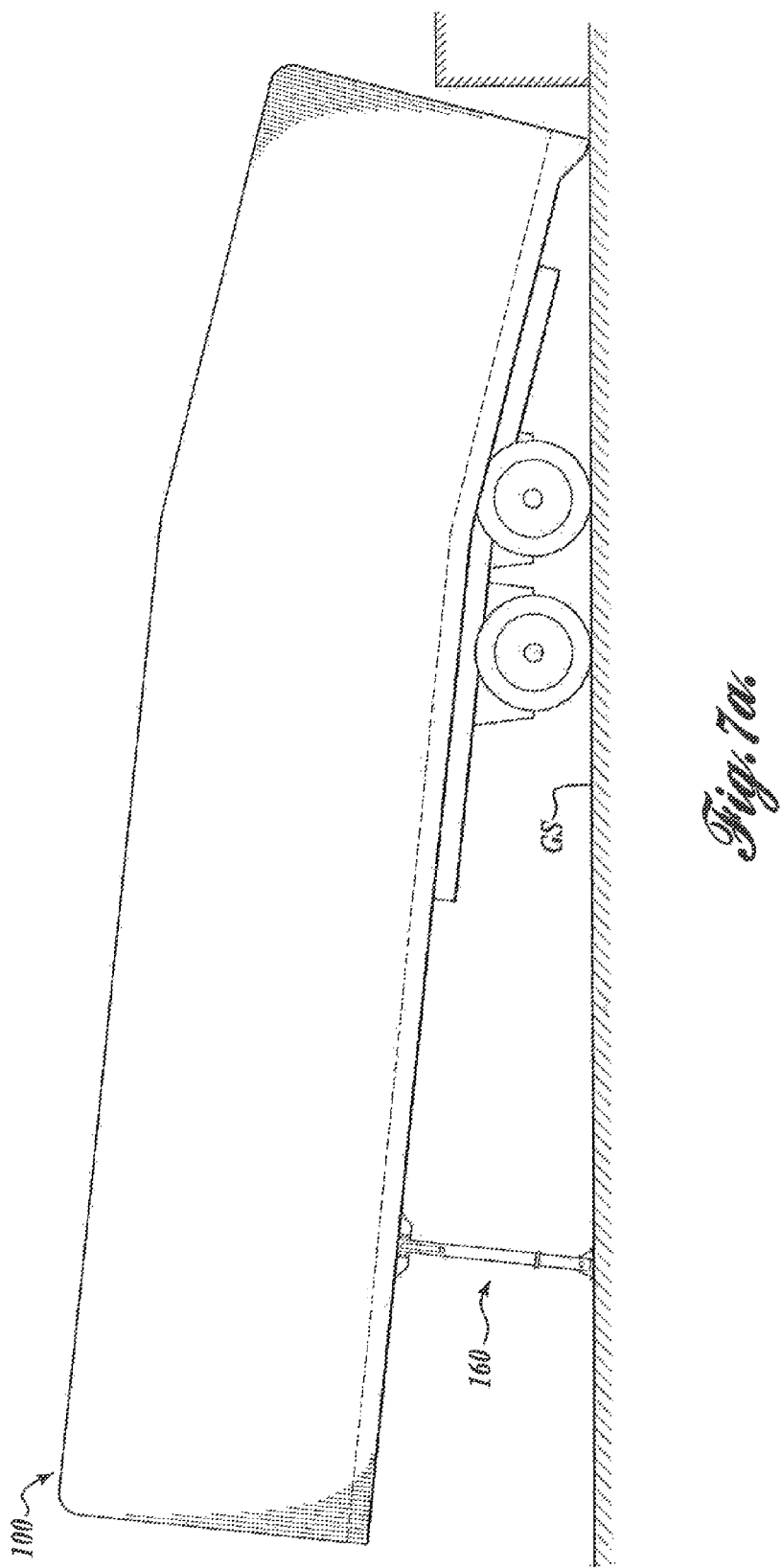
FIGS. 7A and 7B are side views of the trailer in first and second loading/unloading positions utilizing one example of landing gear having extended range.
Figure 7B:
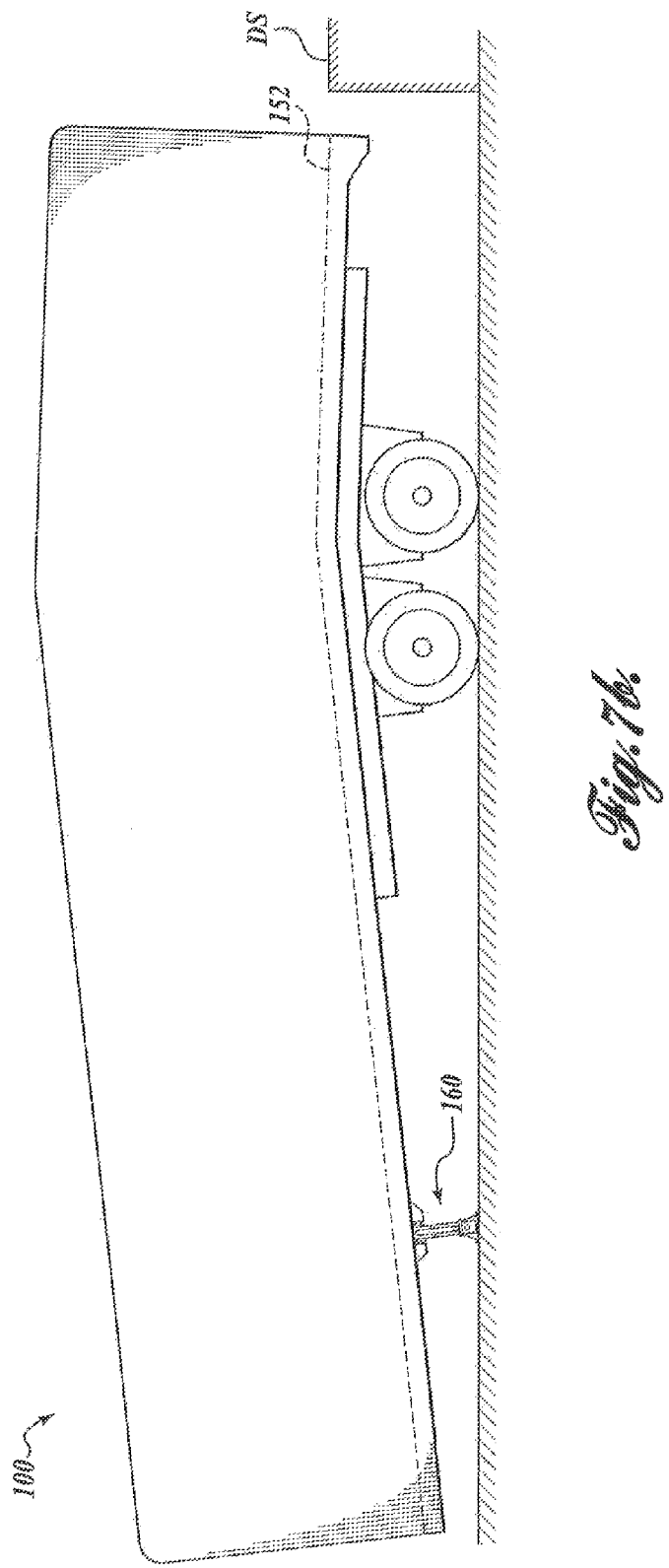

Referring back to FIG. 3, the fore body section 122A is supported by a fifth wheel when attached to the tractor 104, and supported by a support system known as landing gear 160 when detached therefrom (See FIG. 2). In one embodiment, the landing gear 160 may be configured to have an extended travel range. As a result, the landing gear 160 may be used to raise and lower the front and rear ends of the trailer 100, thereby making rampless ground loading/unloading as well as standard dock height loading/unloading an option. For example, the landing gear 160 may be configured such that when extended, the front end of the trailer 100 is raised and the rearward end is lowered proximate the ground surface GS, as best shown in FIG. 7A, and when retracted, the rearward end has attained a position such that the floor 152 of the trailer 100 is approximately level with a horizontal docking surface DS of a standard height dock, as best shown in FIG. 7B.

Referring now to FIG. 8, one embodiment of the landing gear 160 is shown. The landing gear 160 typically includes left and right landing gear supports or legs 164 (only the left leg is shown in FIG. 2). The following description is confined to one of the legs (left leg 164). The other leg (not shown) has a similar construction, but if it is connected to gearing of the illustrated leg such as by a cross shaft extending underneath the front of the trailer 100, the other leg need not have some of the gearing present in the illustrated leg. Such constructions are well understood by those of ordinary skill in the art and will not be further described herein.

Figure 3:
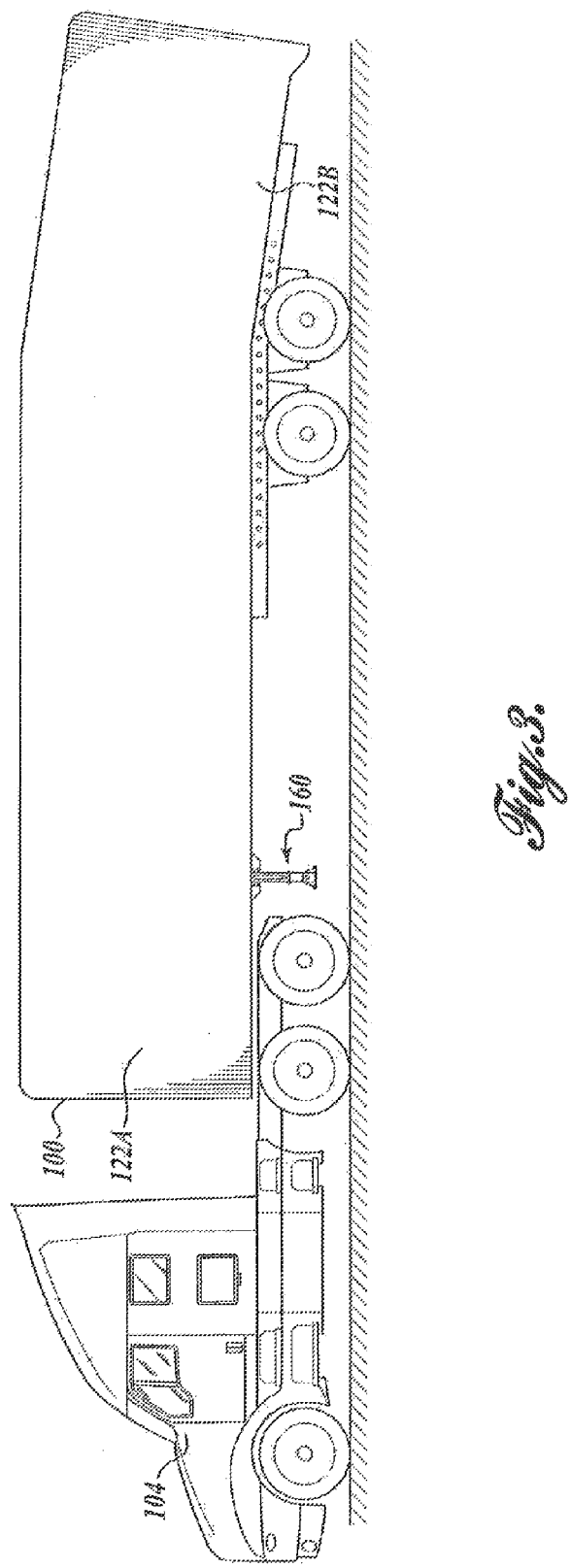
FIG. 3 is a side view of a tractor-trailer combination incorporating the trailer of FIG. 2.

The landing gear legs are located near respective front corners of the trailer 100. Each leg is capable of extending to a deployed position to engage the pavement S or other supporting surface to hold up the front end of the trailer as is well understood in the art. A shoe 168 or other base member is pivotally mounted on the leg 164 for engaging the pavement S. The legs are also capable of retracting to a stowed position when the trailer 100 is being pulled over the road by a tractor, as best shown in FIG. 3. Returning to FIG. 8, a crank handle 170 is used to extend and contract the length of the leg 164, as known in the art.

Still referring to FIG. 8, the landing gear leg 164 includes a lower leg section 176 telescopingly received in an upper leg section 178. The upper leg section 178 has internal dimensions larger than that of the lower leg section 176 so that the lower leg section is telescopingly received in the upper leg section. A mounting plate 180 for attaching the leg 164 to the trailer 100 is attached by bolts, welding, or other suitable means to the upper leg section 178. The leg 164 can be attached to the trailer 100 in either a "conventional mount" or "reverse mount". These labels will be understood by those of ordinary skill in the art and will not be discussed further.

In one embodiment, the lower and upper leg sections 176 and 178 are connected together by a lead screw (hidden in FIG. 8 but well known in the art) for extension and retraction of the lower leg section 176 relative to the upper leg section 178 upon rotation of the lead screw. Alternatively, other mechanisms may be employed for extending and retracting the lower leg section 176 relative to the upper leg section 178, such as pneumatic or hydraulic cylinders. The lead screw is rotated by the crank handle 170 through a suitable configured set of gears (not shown but well known in the art) and an input shaft (hidden in FIG. 8). A cross shaft (hidden in FIG. 8) is suitably coupled between the first and second legs so that rotation of the crank handle 170 rotates the cross shaft, which in turn, rotates the lead screw of the other landing gear leg (i.e., right leg) in unison with the left landing gear leg 164. One gear/lead screw arrangement that may be practiced with embodiments of the present disclosure is described in detail in U.S. Pat. No. 5,199,738, which is hereby incorporated by reference.

Returning to FIG. 2, the aft section 122B of the trailer body 122 is supportably mounted on one or more wheel assemblies, illustrated as 184 and 186. In accordance with aspects of the present disclosure, in one embodiment, one or more carriages carry the wheel assemblies and slide along rails 190 mounted below the bottom of the trailer 100 in a selectively adjustable manner. In that regard, the one or more wheel assembles can slide between a first position, shown in FIG. 9A, and a second, rearwardly position, shown in FIG. 9B.

Figure 10:
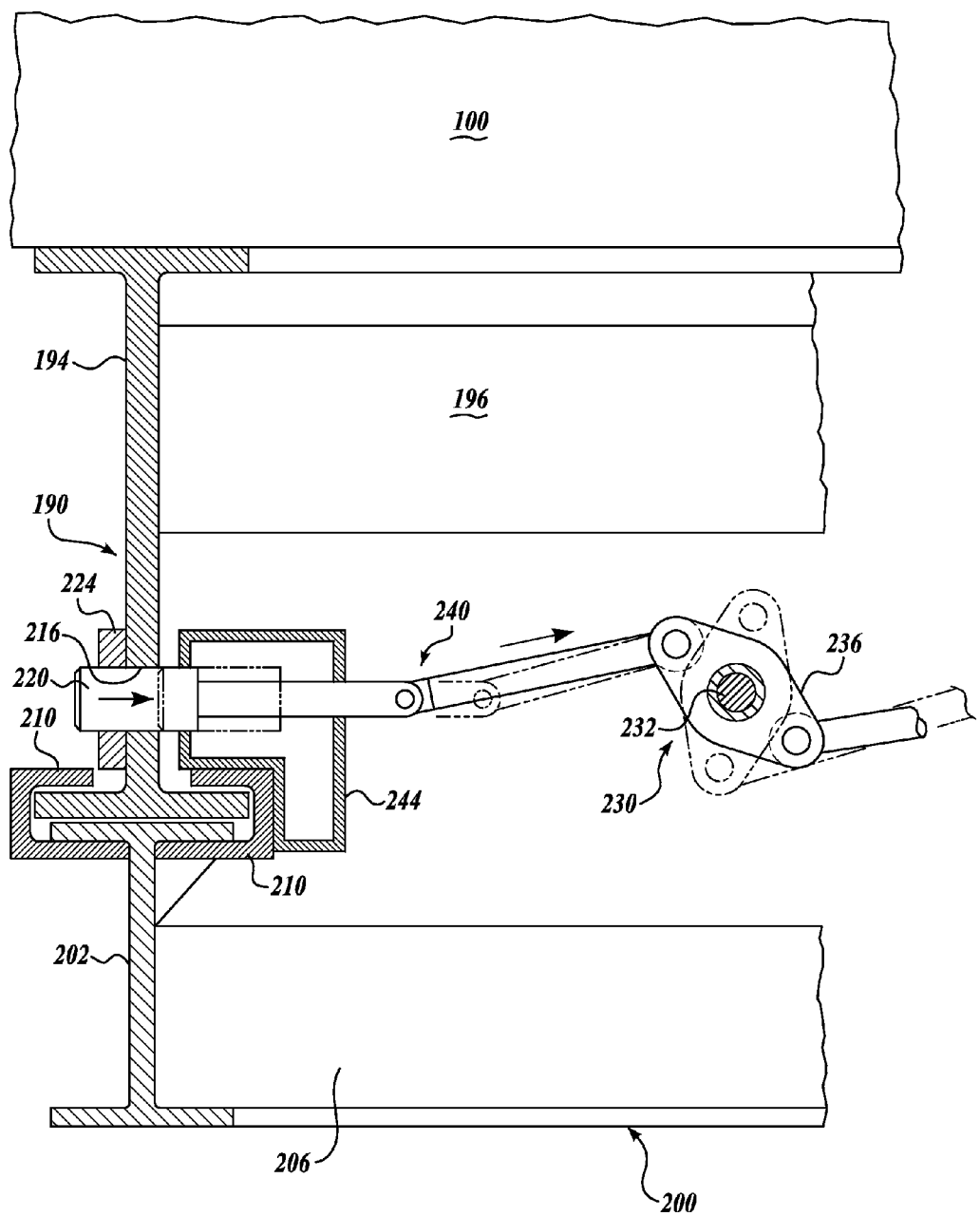
FIG. 10 is a partial cross sectional view of one example slidable wheel assembly shown in FIGS. 9A and 9B and formed in accordance with aspects of the present invention.

Turning now to FIG. 10, there is shown one example configuration for a slidable wheel assembly. As best shown in FIGS. 2 and 10, longitudinally extending, flanged frame members 194, such as I beams, are securely mounted beneath the trailer 100 and form the rails 190. In the embodiment shown in FIG. 2, the rails 190 extend from about midway along the fore section 122A of the trailer 100 to near the rearward end of the trailer 100, and have a somewhat curved longitudinal profile. A plurality of cross members 196 typically extend between the rails in a horizontally spaced condition, as best shown in FIG. 10. The wheels (not shown in FIG. 10) are rotatably attached to axles and are carried by the carriage 200 through conventional suspension components, such as beams, leaf springs, shock absorbers or air bags, etc, which are not shown for ease of illustration. The carriage 200 includes first and second parallely extending rails 202 and one or more cross members 206. Retainers 210 are welded or otherwise securely mounted on the carriage rails 202. The retainers 210 define channels for cooperatively receiving the bottom of frame members 194 in a slideably supporting manner.

In some embodiments, the wheel assemblies can be locked in place once the wheel assemblies 184 and 186 have attained their desired location. One locking configuration that may be practiced with embodiments of the present disclosure employs a pins/holes configuration, and is shown in FIG. 10. As best shown in FIG. 10, the lower portions of each frame member 194 (also referred to as trailer rails 190, as shown in FIG. 2) define a plurality of periodically spaced holes 216 (see also FIG. 2), which are adapted to receive a locking pin 220, as will be described more fully below. In some embodiments, a reinforcing plates 224 is mounted on the exterior vertical surfaces of the frame members, and include holes cooperatingly sized and aligned with the holes 216.

A cooperating locking mechanism 230 is mounted for movement with the wheel assemblies and can be, for example, affixed to the carriage 200. In the embodiment shown, the locking mechanism includes a central shaft 232 rotatably supported by cross members (not shown). A cam 236 is mounted for rotation to the central shaft 232 and is connected to pin 220 through linkage 240. As shown in FIG. 10, the carriage 200 may further include a pin housing 244 that supports axial translation of the pin 220 in a direction transverse to the longitudinal axis of the trailer 100. The pin housing 244 can be welded of otherwise secured to the carriage rails 202. To lock the wheel assemblies in place, the central shaft 232 is manually rotated via an associated lever or hydraulically/pneumatically powered to rotate in a first direction. Upon rotation of the central shaft 232, the cam 236 rotates, which in turn, axially translates the pin 220 with respect to the pin housing 244 in a outwardly manner until the pin 220 extend through hole 216. To unlock the wheel assemblies, the central shaft 232 is rotated in a second direction counter to the first direction.

The wheel assemblies in the unlocked state can be moved relative to the trailer by use of the pull vehicle connected to the trailer and either moving forwardly or rearwardly. Wheel blocks or the like may be used to assist in keeping the wheel assemblies relatively stationary while the pull vehicle moves rearwardly or forwardly. Additionally or alternatively, a hydraulic cylinder (not shown) can be interconnected between the cross member 206 of the carriage 200 and the cross member 196 of the trailer 100 to enable the wheel assemblies to be slidably moved with respect to the trailer 100.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A trailer comprising:
   a wheel assembly including an axle having wheels mounted thereon; and
   a trailer body carried at least partially by the wheel assembly, wherein the trailer body includes a forward section having a generally planar bottom and a rearward section having a generally planar bottom, the rearward section adjoining the forward section and slopes downwardly with respect to the forward section as it extends rearwardly thereof such that an angle is generated between the forward section bottom and the rearward section bottom.

2. The trailer of claim 1, wherein the angle is between approximately 6 degrees and 15 degrees.

3. The trailer of claim 1, wherein the rearward section adjoins the forward section at a common plane.

4. The trailer of claim 1, wherein the transition between the forward section bottom and the rearward section bottom is convex.

5. The trailer of claim 1, wherein a top surface of the forward section and a top surface of the rearward section form a single continuously convex surface as it extends from a front panel of the forward section to the rear panel of the rearward section.

6. The trailer of claim 1, wherein a top surface of the forward section is generally planar and extends generally parallely with the forward section bottom, and a top surface of the rearward section is generally planar and extends generally parallely with the rearward section bottom.

7. The trailer of claim 1, wherein a top surface of the forward section is generally planar and extends generally parallely with the forward section bottom, and a top surface of the rearward section is generally planar and extends generally parallely with the rearward section bottom, and wherein the transition between the top surface of the forward second and the top surface of the rearward section is convexly curved.

8. The trailer of claim 1, wherein the wheel assembly is associated with the rearward section of the trailer body, the wheel assembly being adjustably movable rearwardly with respect to the trailer body so as to elevate the rearward end of the trailer body.

9. The trailer of claim 1, wherein the wheel assembly is associated with the rearward section of the trailer body, the wheel assembly being adjustably movable rearwardly with respect to the trailer body such that the rearward end of the trailer body is elevated to approximately standard docking height.

10. The trailer of claim 1, further comprising at least one support assembly associated with the forward section of the trailer body, the support assembly having an adjustably extendible support leg, wherein the at least one support leg is positionable such that the rearward end of the trailer body is positioned at a standard docking height and is positionable such that the rearward end of the trailer body is proximate a ground surface.

11. The trailer of claim 8, wherein the wheel assembly is associated with the rearward section of the trailer body, the wheel assembly being adjustably movable rearwardly with respect to the trailer body so as to elevate the rearward end of the trailer body to approximately standard docking height in conjunction with at least one support assembly associated with the forward section of the trailer body.

12. The trailer of claim 11, wherein the at least one support assembly includes an adjustably extendible support leg.

13. A trailer comprising:
   a trailer body having a forward end and a rearward end, the rearward end positioned at a lower elevation with respect to a ground surface than the forward end; and
   at least one wheel assembly including an axle and at least two wheels mounted thereon and associated with the rearward end of the trailer body, the wheel assembly adjustably movable rearwardly with respect to the trailer body such that the rearward end of the trailer body is elevated to approximately standard docking height.

14. The trailer of claim 13, wherein the trailer body includes a forward section having a generally planar bottom and a rearward section having a generally planar bottom, the rearward section adjoining the forward section at a common plane and canting downwardly with respect to the forward section as it extends rearwardly thereof such that an angle is generated between the forward section bottom and the rearward section bottom.

15. The trailer of claim 14, wherein the angle is between approximately 6 degrees and 15 degrees.

16. A trailer comprising:
   a trailer body having a forward end and a rearward end, the rearward end positioned at a lower elevation with respect to a ground surface than the forward end;
   at least one support assembly associated with the forward end of the trailer body, the support assembly having an adjustably extendible support leg;
   at least one wheel assembly including an axle and wheels mounted thereon, the at least one wheel assembly associated with the rearward end of the trailer body; and
   wherein the at least one support is positionable such that the rearward end of the trailer body is positionable between a standard docking height and a position proximate the ground surface.

17. The trailer of claim 16, wherein the trailer body includes a forward section having a generally planar bottom and a rearward section having a generally planar bottom, the rearward section adjoining the forward section at a common plane and sloping downwardly with respect to the forward section as it extends rearwardly thereof such that an angle is generated between the forward section bottom and the rearward section bottom.

18. The trailer of claim 17, wherein the angle is between approximately 6 degrees and 15 degrees.

19. The trailer of claim 16, wherein the at least one wheel assembly is adjustably movable between a first position and a second position, and wherein the at least one support and/or the at least one wheel assembly are positionable such that the rearward end of the trailer body is positionable between a standard docking height and proximate the ground surface.

* * * * *